Jan. 7, 1930. J. L. HATCH 1,742,350
APPARATUS FOR DISTRIBUTING FERTILIZER
Filed June 19, 1928 3 Sheets-Sheet 1
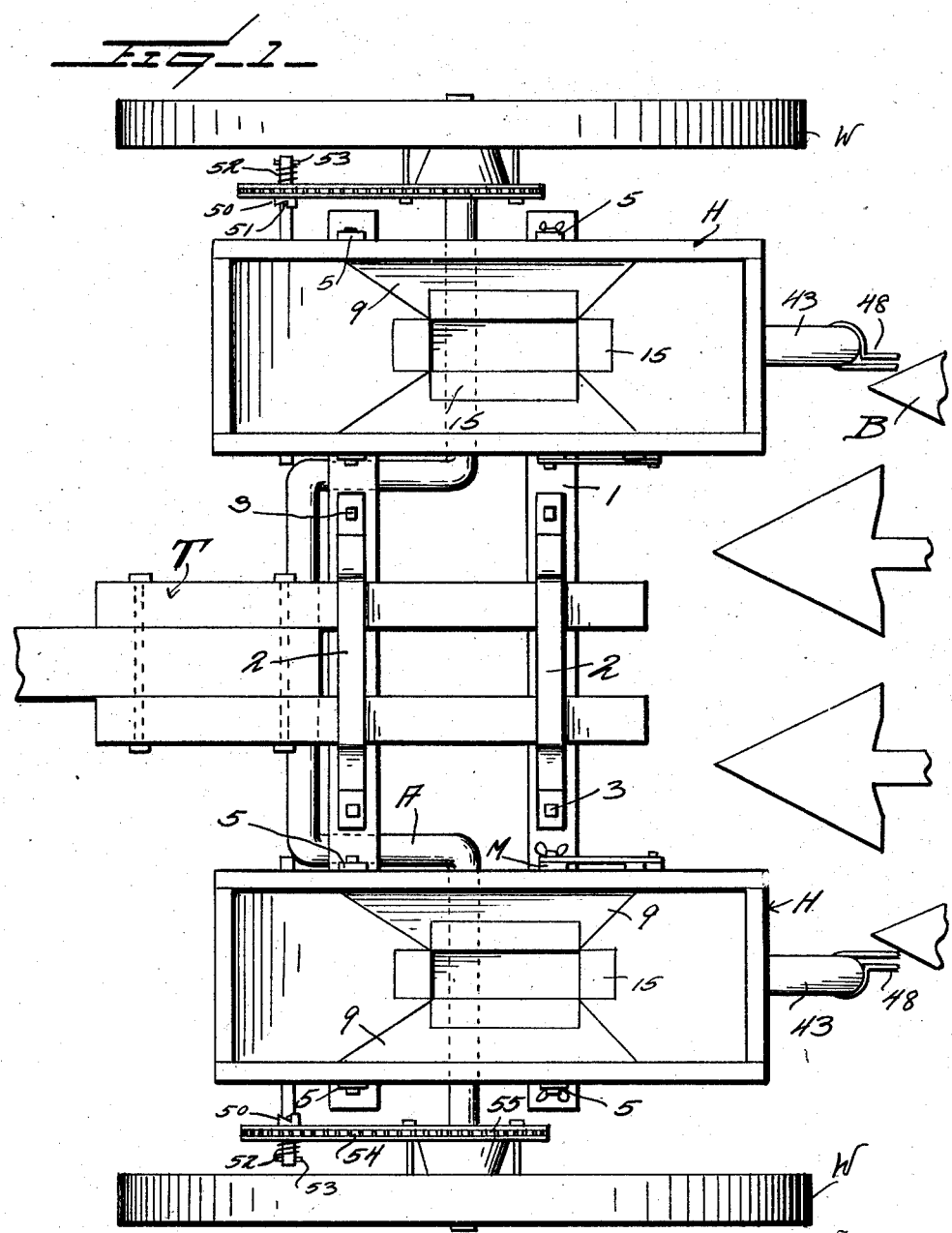
Inventor
J. L. Hatch
By Watson E. Coleman
Attorney

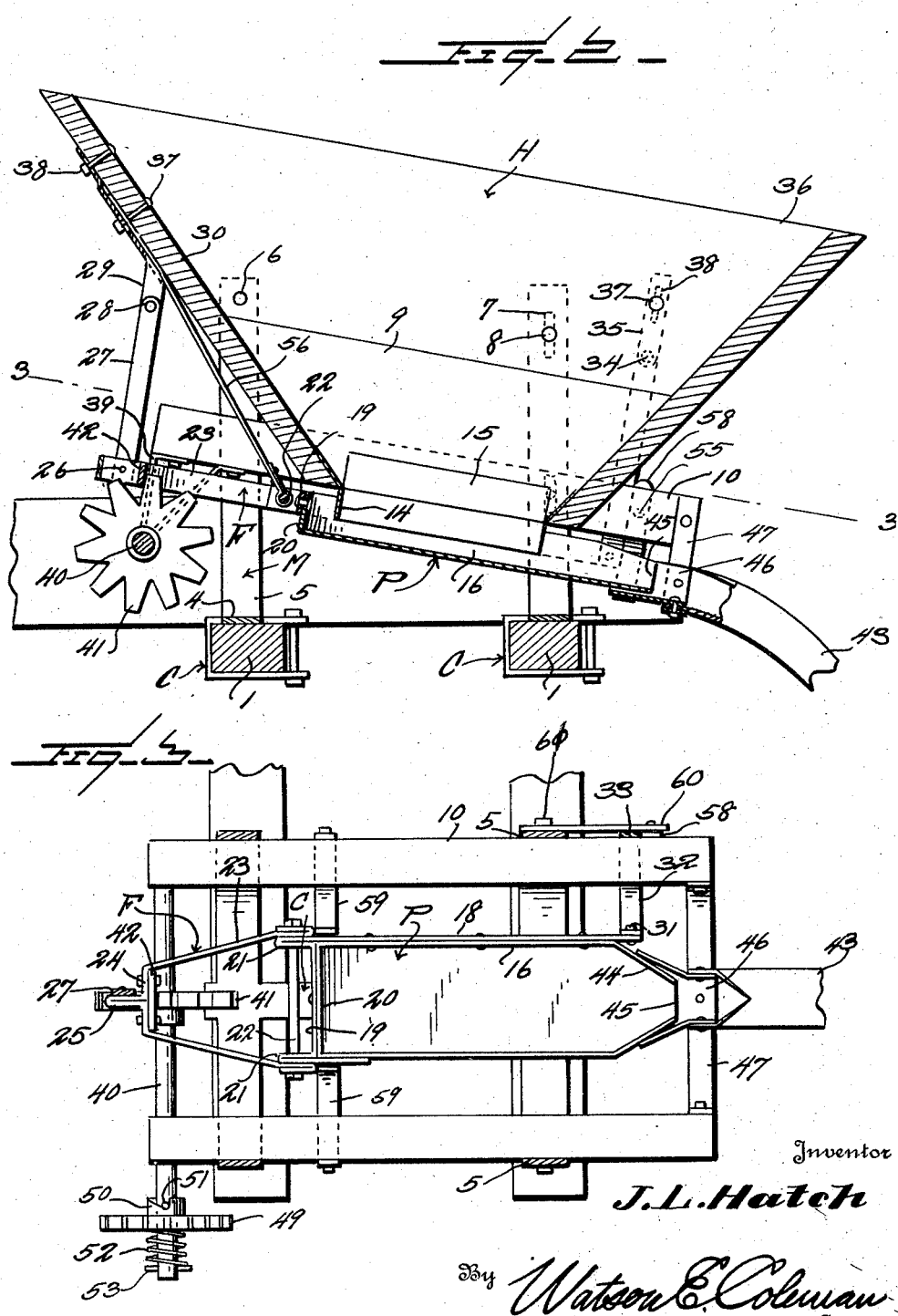

Jan. 7, 1930. J. L. HATCH 1,742,350
APPARATUS FOR DISTRIBUTING FERTILIZER
Filed June 19, 1928 3 Sheets-Sheet 3
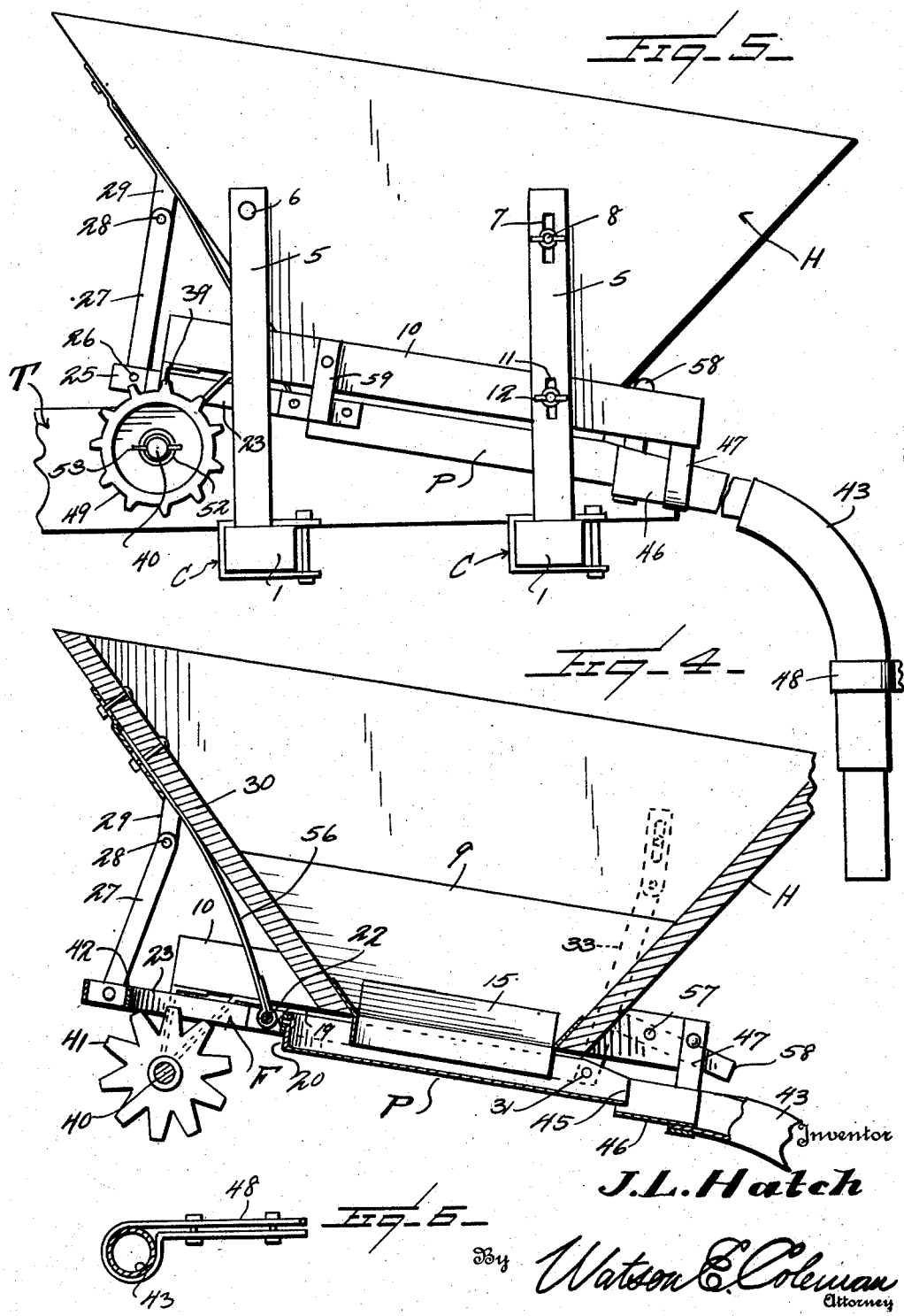

Patented Jan. 7, 1930

1,742,350

UNITED STATES PATENT OFFICE

JOHN LAFAYETTE HATCH, OF BELLEVILLE, ARKANSAS, ASSIGNOR OF ONE-HALF TO ROBERT JACKSON BAILEY, OF BELLEVILLE, ARKANSAS

APPARATUS FOR DISTRIBUTING FERTILIZER

Application filed June 19, 1928. Serial No. 286,695.

This invention relates to an apparatus for distributing fertilizer, and it is an object of the invention to provide a device of this kind which is adapted to be attached to a walking cultivator or kindred agricultural implement.

Furthermore, it is an object of the invention to provide an apparatus of this kind, whereby the desired fertilizer can be either deposited upon the soil in advance of a plow to permit the fertilizer and soil being mixed in a single operation, or said fertilizer can be deposited in the furrow at the rear of a plow.

An additional object of the invention is to provide a device of this kind constructed and assembled in a manner whereby the discharge from the apparatus may be regulated in accordance with the desired amount of fertilizer per acre.

A still further object of the invention is to provide an apparatus of this kind which is readily adjustable to permit the apparatus to be used to fertilize growing plants being cultivated.

The invention consists in the details of construction and in the combination and arrangement of the several parts of my improved apparatus for distributing fertilizer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a fertilizer distributor constructed in accordance with an embodiment of my invention;

Figure 2 is an enlarged fragmentary view partly in vertical section and partly in elevation illustrating one of the hoppers and the mechanism directly associated therewith;

Figure 3 is a sectional view taken substantially on the line 3—3 of Figure 2;

Figure 4 is a view similar to Figure 2 with the pan locked in inoperative position;

Figure 5 is a fragmentary view in side elevation of the apparatus as herein employed;

Figure 6 is a view partly in section and partly in plan of the means for supporting the discharge end portion of the delivery hose.

As herein disclosed, my improved apparatus comprises a pair of parallel beams 1 which, when applied to a cultivator, are disposed transversely to the direction of travel of the cultivator and underlie the draft tongue T of the cultivator and held thereto by the straps 2 disposed over the tongue T with their extremities anchored, as at 3, to the upper faces of the beams 1 at opposite sides of the tongue T.

The beams 1 are preferably positioned at the rear of the arch of the axle A. This axle A is comprised in the cultivator proper and has mounted on its opposite end portions the ground engaging wheels W of the desired diameter.

The beams 1 may be collectively considered as a supporting frame and said frame at each end portion thereof is provided with the substantially U-shaped upstanding members M, the base portion 4 of each of which having direct contact with the upper face of a beam 1 and held thereto by the clamps C. By loosening the clamps the members M may be adjusted lengthwise of the beams 1 to a point best preferred.

The upstanding arms 5 of the members M provide a support for a hopper H, the forward arms 5 having their upper end portions pivotally connected, as at 6, with the side walls of the hopper H while the upper portions of the rear arms 5 are each provided with a longitudinally disposed slot 7 through which is directed a clamping member 8 carried by the adjacent side wall of the hopper. By this particular mounting of the hopper H the same is capable of limited vertical swinging adjustment in order to arrange the hopper H on a desired angle. The hopper H is of a conventional type having its bottom open.

The front and rear walls of the hopper H are disposed on inward and downward inclines toward said open bottom of the hopper while the lower portions of the side walls are inwardly inclined in order to assure effective discharge of the fertilizer material within the hopper H through the open bottom thereof. The inclined lower portions 9 of the side walls of the hopper in the present instance comprise inserts and the lower portions of the side walls proper comprise beams 10 which extend force and aft of the lower portion of the hopper. The rear arms 5 are each provided with a lower longitudinally disposed slot 11 through which is disposed a clamping medium 12 carried by the adjacent beam 10 to further maintain the hopper H in desired adjusted position.

The open bottom of the hopper H is defined by a discharge spout 14 of desired length and maintained in applied or working position through the instrumentality of the flanges 15 overlying the lower portions of the inner walls of the hopper H. Underlying the open bottom of each of the hoppers H is a pan P to the outer longitudinal flange 16 of which is riveted or otherwise secured a strip 18. One end portion of this strip is continued, as at 19, to overlie the front flange 20 of the pan P and is riveted or otherwise attached thereto. The portion 19 of the strip 18 adjacent to opposite sides of the pan P is formed to provide the outstanding arms 21 through which is directed a bolt 22. This bolt 22 is also disposed through the overlying extremities of the side arms 23 of a forwardly directed frame F. This frame F is substantially U-shaped in form with the side members or arms 23 converging toward the outer intermediate portion 24 thereof.

The central part of the portion 24 is formed to provide a forwardly directed arm 25 with which is pivotally engaged, as at 26, the lower end portion of a rigid link 27. The upper portion of this link 27 is pivotally connected, as at 28, to a bracket 29 depending a desired point from the front wall 30 of the hopper H. The rear portion of the strip 18 has pivotally connected thereto, as at 31, an inwardly directed foot member 32 carried by the lower portion of a rigid link 33. The upper end portion of this link 33 is pivotally connected, as at 34, with a bracket 35 secured to the outer side face 36 of the hopper H. It is to be noted that the brackets 29 and 35 are connected to the walls 30 and 36 respectively of the hopper H in a manner whereby the same may be adjusted toward or from the pan P for a purpose to be hereinafter referred to. As herein disclosed, this adjustment is effected by having the holding bolts 37 directed through longitudinally disposed slots 38 in the brackets 29 and 35.

Depending from the forward end portions of the beams 10 are the bearing members 39 which rotatably support a shaft 40. This shaft 40 substantially midway of the beams 10 has fixed thereto a toothed wheel 41 which, upon forward rotation of the shaft 40, engages a wear plate 42 secured to the inner or rear face of the intermediate portion 24 of the frame F resulting in an effective vibration of the pan P to cause the fertilizing material deposited upon the pan P from the hopper H to pass rearwardly thereof for discharge through the hose 43. The rear portion of the pan P is reduced in width, as at 44, to provide a restricted discharge 45 at the rear lower end of the pan P for delivery upon the apron 46 carried by the central portion of a saddle 47 interposed between and secured to the rear end portions of the beams 10. The receiving end portion of the hose 43 is suitably affixed to this apron 46 so that the material received upon the apron 46 will be carried off through the hose 43. The hose 43 may be arranged so as to discharge the fertilizer either in advance of the plow or in the furrow to the rear of the plow. For ordinary uses in distributing fertilizer prior to planting the seed the fertilizer is preferably discharged in the furrow in the rear of the plow or cultivator blade. The delivery end portion of the hose 43 may be supported in any desired manner, as by the medium of a bracket arm 48. Each of these brackets 48, or hose holder as it may be termed, can be readily attached to either the front or rear hook of a cultivator.

An end portion of each of the shafts 40 has loosely mounted thereon a sprocket wheel 49. This sprocket wheel 49 is provided with a clutching hub 50 coacting with an outstanding pin 51 carried by the shaft 40. The clutching hub 50 and pin 51 are normally maintained in clutching engagement by the spring 52 encircling the shaft 40 outwardly of the wheel 49 and interposed between said wheel 49 and a retaining pin 53. The wheel 49 is in driven connection through the sprocket chain 54 with a sprocket 55 clamped to the hub portion of the adjacent ground engaging wheel W. As the wheels W are traveling forwardly, the shaft 40 will be properly rotated but, upon reverse rotation of the wheels, the sprocket wheel 49 will rotate freely upon the shaft 40 against the tension of the spring 52.

To further assure the requisite vibration of the pan P, the bolt 22 hereinbefore referred to has secured to its central portion the lower end portion of a flat spring 56, the opposite or upper end portion of which being anchored to the front wall 30 of the hopper H.

As contact of a tooth of the wheel 40 engages the plate 42, the pan P will be moved in a forward direction and, as this plate 42 slips or passes over such tooth, the spring 56 will be under sufficient tension to quickly force the pan P in the opposite direction for contact with a succeeding tooth. By adjusting the bracket 29 toward or from the bottom of the hopper H, the extent of vibration of the pan P may be regulated. If the bracket 29 is moved upwardly, the teeth of the wheel 41 will pass the plate 42 and the extent of vibration will be correspondingly reduced. Upon lowering the bracket 29 the extent of vibration will be correspondingly increased.

In order to render a pan P inoperative or to maintain the same in a position free of action by the wheel 41, I pivotally connect, as at 57, to the rear portion of each of the beams 10 a lever 58. This pivotal connection 57 is at a desired distance intermediate the ends of the lever 58 so that when the lower portion of said lever 58 is swung upwardly and rearwardly the opposite end portion will have contact with the link 33 and swing the same forwardly a distance to move the plate 42 out of the way of the wheel 41.

To hold the pan P against undue lateral movement during its vibratory action, I provide the beams 10 at the forward portion of the pan with the inwardly disposed arms 59 terminating in close proximity to the pan and thereby preventing the pan from having any undue lateral movement. Coacting with this lever 58 is a guard strip 60 affixed, as at 61, to a side arm 5 of an adjacent member M.

The arms 59 also serve as stops for limiting the rearward or return movement of the pan P, the extremities of the arms 23 coming into contact with said arms 59, thus assuring an abrupt stop whereby is facilitated the requisite rearward travel of the material on the pan P.

From the foregoing description it is thought to be obvious that an apparatus for distributing fertilizer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim :—

1. A fertilizer distributing apparatus comprising, in combination, a hopper having a discharge opening, a pan underlying the discharge opening and upon which the hopper discharges, said pan including a side wall, a strip secured to and extending along said side wall, a link pivotally connected with the hopper and with an end portion of the strip, an outwardly disposed frame carried by the pan at the end portion thereof remote from the end portion of the strip with which the link is engaged, a second link pivotally connected with the outer portion of the frame and the hopper, both of the links providing means to support the pan for vibratory movement, mechanical means coacting with the frame for successively imparting movement to the pan in one direction, and automatic means for imparting intermittent movement to the pan in the opposite direction.

2. A fertilizer distributing apparatus comprising, in combination, a hopper having a discharge opening, a pan underlying the discharge opening and upon which the hopper discharges, said pan including a side wall, a strip secured to and extending along said side wall, a link pivotally connected with the hopper and with an end portion of the strip, an outwardly disposed frame carried by the pan at the end portion thereof remote from the end portion of the strip with which the link is engaged, a second link pivotally connected with the outer portion of the frame and the hopper, both of the links providing means to support the pan for vibratory movement, mechanical means coacting with the frame for successively imparting movement to the pan in one direction, automatic means for imparting intermittent movement to the pan in the opposite direction, said strip being continued to provide a portion overlying and secured to and end of the pan, said portion adjacent the opposite sides of the pan being provided with forwardly disposed arms, and means for connecting an end portion of the frame to said arms.

3. A fertilizer distributing apparatus comprising, in combination, a hopper having a discharge opening, a pan underlying the discharge opening and upon which the hopper discharges, said pan including a side wall, a strip secured to and extending along said side wall, a link pivotally connected with the hopper and with an end portion of the strip, an outwardly disposed frame carried by the pan at the end portion thereof remote from the end portion of the strip with which the link is engaged, a second link pivotally connected with the outer portion of the frame and the hopper, both of the links providing means to support the pan for vibratory movement, mechanical means coacting with the frame for successively imparting movement to the pan in one direction, automatic means for imparting intermittent movement to the pan in the opposite direction, and arms positioned at opposite sides of the pan to prevent said pan having undue lateral movement, said arms coacting with the frame to limit the intermittent movement thereof by the automatic means.

4. A fertilizer distributing apparatus comprising, in combination, a hopper having a discharge opening, a pan underlying the discharge opening and upon which the hopper discharges, said pan including a side wall, a strip secured to and extending along said side wall, a link pivotally connected with the hopper and with an end portion of the strip, an outwardly disposed frame carried by the pan at the end portion thereof remote from the end portion of the strip with which the link is engaged, a second link pivotally connected with the outer portion of the frame and the hopper, both of the links providing means to support the pan for vibratory movement, mechanical means coacting with the frame for successively imparting movement to the pan in one direction, and automatic means for imparting intermittent movement to the pan in the opposite direction, said frame being substantially U-shaped with its intermediate portion outwardly disposed, said intermediate portion having a forwardly directed arm with which the second named link is engaged.

5. A fertilizer distributing apparatus comprising, in combination, a hopper having a discharge opening, a pan underlying the discharge opening and upon which the hopper discharges, said pan including a side wall, a strip secured to and extending along said side wall, a link pivotally connected with the hopper and with an end portion of the strip, an outwardly disposed frame carried by the pan at the end portion thereof remote from the end portion of the strip with which the link is engaged, a second link pivotally connected with the outer portion of the frame and the hopper, both of the links providing means to support the pan for vibratory movement, mechanical means coacting with the frame for successively imparting movement to the pan in one direction, and automatic means for imparting intermittent movement to the pan in the opposite direction, and a lever pivotally supported adjacent to one of the links, said lever when moved in one position engaging said link to hold the pan in a position to release the same from vibratory movement.

In testimony whereof I hereunto affix my signature.

JOHN LAFAYETTE HATCH.